W. S. FAIRHURST.
VALVE.
APPLICATION FILED DEC. 5, 1914.
1,153,051.
Patented Sept. 7, 1915.
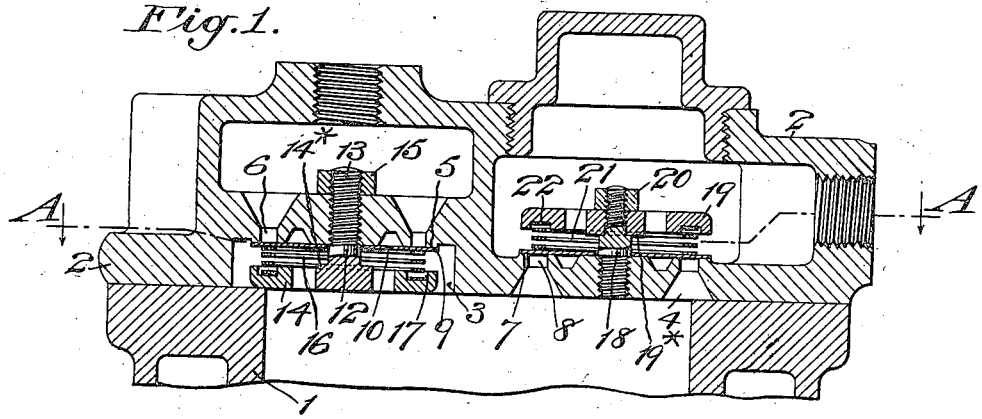
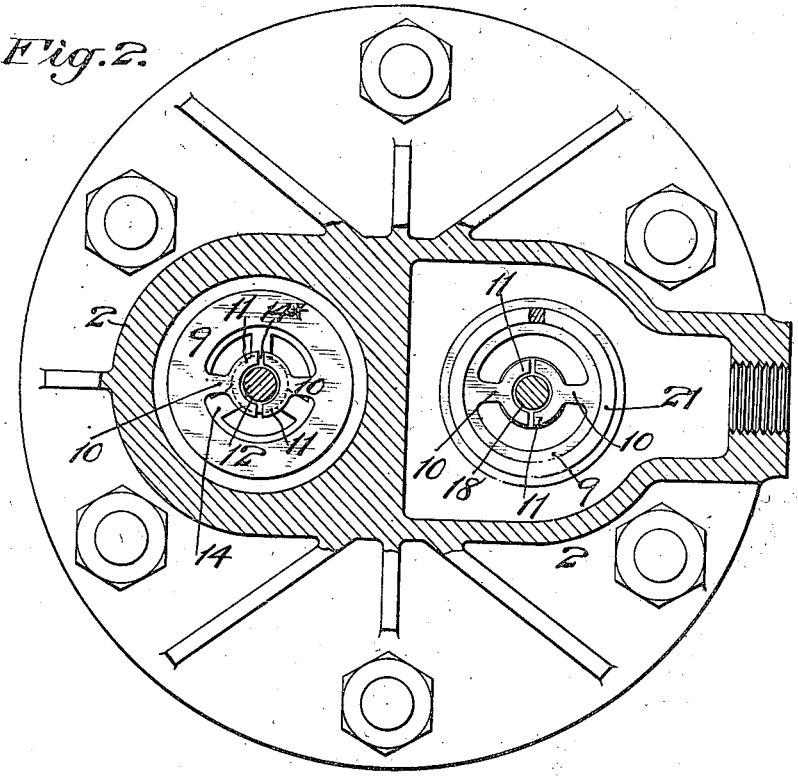
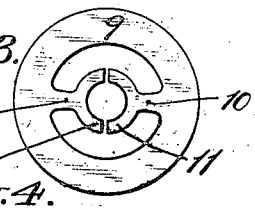
Witnesses:—
Hyperion Barry.
F. George Barry.
Inventor:—
William S. Fairhurst
by attorneys

UNITED STATES PATENT OFFICE.

WILLIAM S. FAIRHURST, OF NEW YORK, N. Y.

VALVE.

1,153,051.

Specification of Letters Patent. Patented Sept. 7, 1915.

Application filed December 5, 1914. Serial No. 875,651.

*To all whom it may concern:*

Be it known that I, WILLIAM S. FAIRHURST, a citizen of the United States, and resident of the borough of Brooklyn, in the city and State of New York, have invented a new and useful Improvement in Valves, of which the following is a specification.

This invention relates to valves with the object to provide certain improvements in the construction, form and arrangement of the several parts whereby its operation is facilitated and its structure simplified and it is capable of use either as a suction valve or as a discharge valve.

A practical embodiment of my invention is represented in the accompanying drawings, in which—

Figure 1 represents in section a portion of a fluid compressor with a suction and a discharge valve applied thereto, Fig. 2 represents a horizontal section taken in the plane of the line A—A of Fig. 1, Fig. 3 represents a plan view of the valve proper, and Fig. 4 represents a side view of the same.

The cylinder, denoted by 1, is shown as provided with the usual cylinder head 2 having an inlet port 3 and an outlet port 4. The cylinder head 2 is also provided with an inlet valve seat 5, a fluid passage 6 therethrough, and an outlet valve seat 7 having a fluid passage 8 therethrough.

The valve is formed of spring sheet metal, such as steel, and comprises an annular portion 9 and two or more inwardly projecting spring arms 10. In the present instance, I have shown two of these arms 10 diametrically opposed and provided with yokes 11, which together are adapted to embrace the smooth portion 12 of a guide pin 13, projecting from a central hub 14* of a retainer plate 14 of the suction valve. The retainer plate 14 is secured to the head 2 by the guide pin 13 having a threaded engagement therewith and locked to the head by a nut 15.

A coil spring 16, formed of flat wire, is interposed between the annular portion 9 of the valve proper and the retainer plate 14, and it is seated in an annular recess 17 in the retainer plate, which spring serves to hold the valve normally closed.

The spring arms 10 of the valve proper permit the valve to be self-yielding after the valve has reached the limit of its bodily movement away from the valve seat.

When the valve is used as a discharge valve, the yokes of the arms 10 embrace the smooth portion of a screw threaded guide pin 18, tapped into the head 2. The outer end of the guide pin is threaded to receive a retainer plate 19 and is locked in position on the pin by a nut 20. The retainer plate 19 is provided on its face adjacent to the valve seat with a projecting hub 19* through which the guide pin 18 passes. A coil spring 21 formed of flat wire is interposed between the annular portion 9 of the valve proper and the retainer plate 19, and it is seated in an annular recess 22 in the retainer plate, which spring serves to hold the valve normally closed.

It is intended to make the valve proper of spring sheet steel, thereby better enabling the valve to withstand the constant hammering on its seat due to the rapidity of operation of the valve, and insuring a long life therefor. It will also be seen that the valve proper has a bodily movement toward and away from its seat and that it also has a self-yielding movement thus permitting a very wide opening of the valve with a relatively short movement of the valve on its guide. I also prefer to use with the valves, flat coil springs, thereby preventing undue wear upon the valve proper.

The centrally projecting hubs 14* and 19* of the suction and discharge valves, serve to engage the arms 10 upon the opening movement of the valves, thereby preventing the annular portion of the valves from striking the plate or shivering, which causes the valve to crack or break when operated at high speed.

While I have shown this valve in connection with the cylinder head of a fluid compressor, it is to be understood that the valve may be used wherever applicable.

What I claim is:

1. A sheet metal valve comprising an annular portion having inwardly projecting arms which together are adapted to embrace a central guide.

2. A sheet metal valve comprising an annular portion having inwardly projecting arms having yokes which together are adapted to embrace a central guide.

3. A valve comprising a valve seat, a valve retainer plate, a guide pin connecting the plate with the seat and a sheet metal valve proper comprising an annular portion having inwardly projecting arms which together are adapted to embrace said pin.

4. A valve comprising a valve seat, a valve retainer plate, a guide pin connecting the plate with the seat, and a sheet metal valve proper comprising an annular portion having inwardly projecting arms having yokes which together are adapted to embrace said pin.

5. A sheet metal valve comprising an annular portion having two inwardly and oppositely projecting arms having yokes which together are adapted to embrace a central guide.

6. A valve comprising a valve seat, a valve retainer plate, a guide pin connecting the plate with the seat and a sheet metal valve proper comprising an annular portion having two inwardly and oppositely projecting arms having yokes which together are adapted to embrace said pin.

7. A valve comprising a valve seat, a valve retainer plate, a guide pin connecting the plate with the seat, a sheet metal valve proper comprising an annular portion having inwardly projecting arms, which together are adapted to embrace said pin, and a flat coil spring interposed between said annular portion of the valve proper and the retainer plate.

8. A valve comprising a valve seat, a valve retainer plate, a guide pin connecting the plate with the seat, a sheet metal valve proper comprising an annular portion having inwardly projecting arms having yokes which together are adapted to embrace said pin, and a flat coil spring interposed between said annular portion of the valve proper and the retainer plate.

9. A valve comprising a valve seat, a valve retainer plate provided with a projecting hub, a guide pin connecting the plate with the seat, and a sheet metal valve proper comprising an annular portion having inwardly projecting arms which together are adapted to embrace said pin.

In testimony, that I claim the foregoing as my invention, I have signed by name in presence of two witnesses, this seventeenth day of November 1914.

WILLIAM S. FAIRHURST.

Witnesses:
F. GEORGE BARRY,
HENRY C. THIEME.